455-5 EX
FIP8102 OR 3.597.692
1

[11] 3,597,692

[72] Inventor Pierre Fannoy
Avenue du Manoir 3, Genese, Belgium

[21] Appl. No. 797,838
[22] Filed Feb. 10, 1969
[45] Patented Aug. 3, 1971
[32] Priority Nov. 29, 1968
[33] Belgium
[31] 48550

[54] PROCESS AND APPARATUS FOR THE SELECTIVE TRANSMISSION OF IMAGES BY TELEVISION SET
6 Claims, 4 Drawing Figs.

[52] U.S. Cl. 325/308, 178/DIG. 13
[51] Int. Cl. H04b 3/02, H04n 7/10, H04n 7/18
[50] Field of Search 178/6 PD; 325/308

[56] References Cited

UNITED STATES PATENTS 3,278,677 10/1966 Fannoy 178/DIG. 13
3,280,249 10/1966 Gargini 178/DIG. 13
3,366,731 1/1968 Wallerstein 325/308
3,435,358 3/1969 Rheinfelder 178/DIG. 13

*Primary Examiner*—Bernard Konick
*Assistant Examiner*—Howard W. Britton
*Attorney*—Richards & Geier

ABSTRACT: Process and apparatus for the selective transmission of images by ordinary commercial television set, characterized in that it substantially comprises recording program carriers; also recording on said program carriers at least one track for code signals; combining with said program carriers, means for selecting them, running and rewinding them respectively; interpolating between said program carriers and each commercial television receiver; a converter-selector operable by the interested person; coordinating said program carriers and said converter-selectors such that after transmission said program carriers are returned to the ready position and that in addition, in the event that a program selected by the interested person is not free, said person receives an occupied signal.

INVENTOR.
P. Tannoy
BY
Richards & Geier
ATTORNEYS

INVENTOR.
P. Fannoy
BY
Richards & Geier
ATTORNEYS

INVENTOR.
P. Fannoy
BY
Richards & Geier
ATTORNEYS

INVENTOR.
P. Fannay
BY
Richards & Geier
ATTORNEYS

PROCESS AND APPARATUS FOR THE SELECTIVE TRANSMISSION OF IMAGES BY TELEVISION SET

The invention relates to the organization of the selective transmission of images by television set in communities, from a large number of programs, the subjects of which may be either undetermined, or determined depending upon the common aspirations of the community in question.

For this purpose, the invention discloses a process and apparatuses such that at any moment, they permit any subscriber to the organization to select one or more programs provided by the organization and to receive said selected programs on an ordinary commercial television receiver. These programs can be recorded on any types of suitable carriers, called hereinafter "programs carriers" for the sake of simplicity.

In this specification "organization" means an assembly or a group substantially composed of transmitting means, receiving means, an indeterminate and infinitely variable number of recorded programs and selector means controlled by each of the subscribers.

Such an organization can be of a general nature, giving information, instruction or entertainment, or of a specialized nature. In other words, such an organization can be concerned with the public in general or it can be directed to restricted groups without common specialization; or yet again, the organization can be concerned with selected groups which are interested in given specific problems: technical, social, artistic, educational or the like.

The process according to the invention substantially comprises recording program carriers; also recording on said program carriers at least one track for code signals; combining with said program carriers means for selecting them, running and rewinding them respectively; interpolating between said program carriers and each commercial television receiver a converter-selector operable by the interested person; coordinating said program carriers and said converter-selectors such that after transmission, said program carriers are returned to the "ready" position and that in addition, in the event that a program selected by the interested person is not free, said person receives an occupied signal. According to this process, each program carrier has a recorded signalling track which can control the opening of the circuit of the converter-selector of the subscriber who is calling at the beginning of the program and which closes said circuit at the end of said program. This track also has a pulse recording which differs from the preceding signalling track, which controls the automatic rapid return of the program carrier to its starting point in order to be able to recommence transmission. The program carrier required is set in operation by sending a code signal issuing from the converter-selector of the subscriber. If the program is already in the course of transmission to another subscriber, the subscriber calling will have to wait for the end of the program in transmission as the circuit of his converter-selector only opens with the signalling pulse at the beginning of the program carrier. The program carrier is substantially variable, solid, liquid or the like. By way of nonlimitative example, magnetic tape or magnetoscope tape or film is especially mentioned in this specification. The material which may be applied by carrying out this process is substantially variable, depending upon the material used as program carriers, the density of the programs, the organization and the degree of automation desired. The receivers are generally commercial television sets. The converter-selector will be interposed between the aerial connection of the receiver and the supply circuit. It will generally form a frequency-changer apparatus and will be provided with a selector device, the operating member of which can be a keyboard, a disc, a perforated support or the like. The link or the transmission between the transmitting and receiving systems can be made in any suitable manner, for example by coaxial cables.

In order better to illustrate the essential features of the process and apparatuses according to this invention, an embodiment is described by way of nonlimitative example hereinafter, with reference to the diagrams of the accompanying drawings, in which.

In the embodiment illustrated in diagrammatic form in the accompanying drawings, the programs are recorded on a magnetoscope, with UHF transmission, a UHF/VHF converter-selector and commercial television receivers. The converter-selector is of the type described in U.S. Pat. No. 3,278,677.

In itself, transmission does not raise any particular problem except with regard to recording the magnetoscope program tapes as described above, and adapting the selection and transmission material so that it is subordinated to the signals and codes in order automatically to begin and to end a program selected by a subscriber, either directly or after a waiting period, for example, in cases where a program selected by a subscriber is already being transmitted for another subscriber. The space required by the transmitting station will depend on the number of programs capable of being transmitted. The premises occupied by the magnetic tapes will obviously be air conditioned in order to protect the magnetic tapes, particularly from dust, excessive humidity, and detrimental variations in temperature.

Preferably, the entire equipment will be transistorized.

Selection of the programs chosen by the subscribers can be effected by substantially variable means, particularly depending upon the manner in which relative movements between the carriers of the program tapes and the transmission apparatus proper will be effected. In fact, it is easy to construct an apparatus of this type so that the supports for the program tapes remain immobile and the pickup is mobile or, conversely, the program tapes are mobile and the pickup remains immobile, or yet again, both program tapes and pickup are mobile. These different embodiments lead to the same result, namely transmitting the programs selected by the subscriber.

Figure 1:
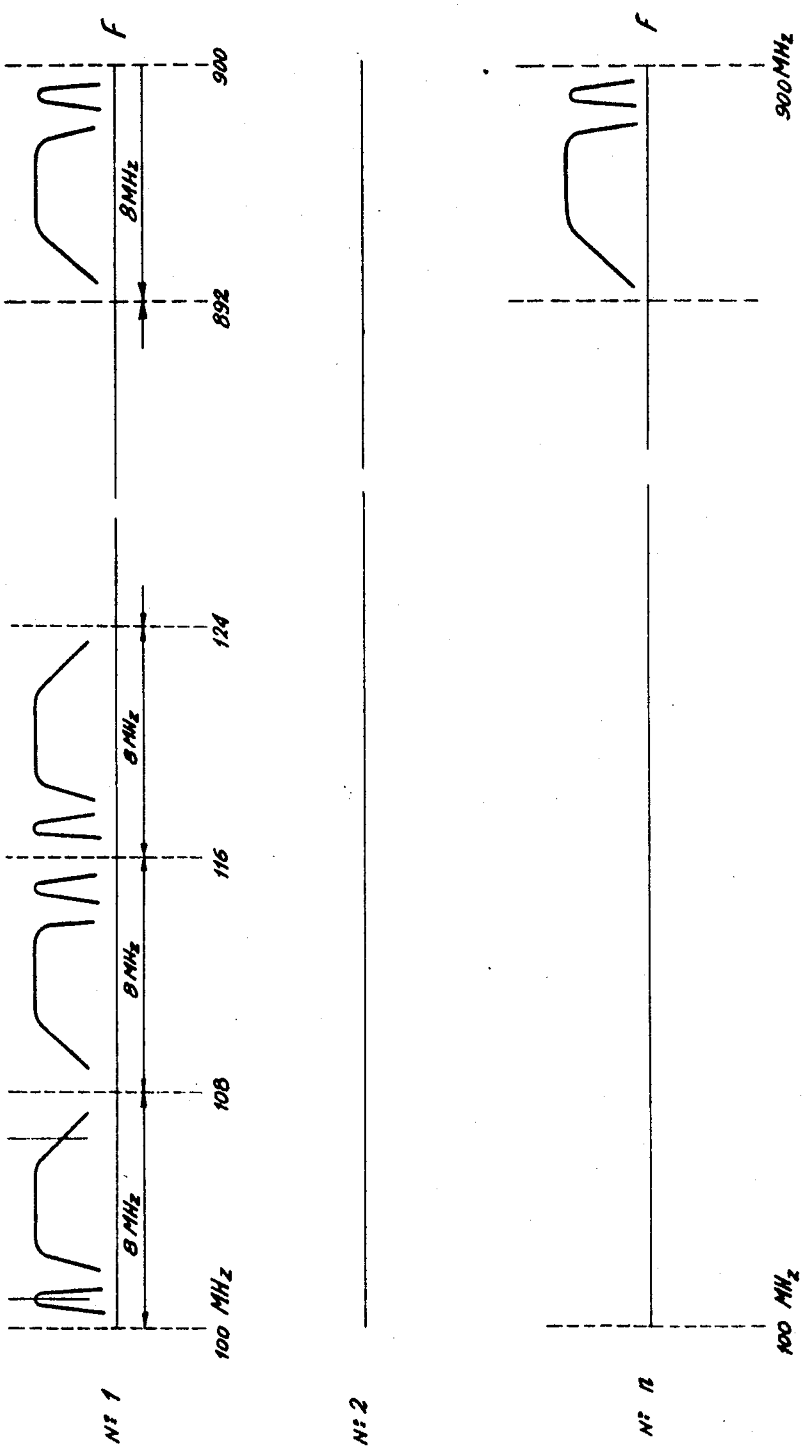
FIG. 1 illustrates in diagrammatic form the features of UHF cables which may be used in the application of the process according to the invention.

In the embodiment illustrated, signalling is effected by 1,000 Hz. pulses for example and the different programs will be transmitted on UHF (Ultrahigh Frequency), between 100 and 900 MHz. If channels with a total width of 8 MHz. are used, (900–100)/8=100 channels are obtained. This would permit 100 programs to be distributed by means of a single coaxial cable, bearing in mind that the UHF cable must obviously be of high quality and the equipment must have a good degree of selectivity (see FIG. 1).

The number of cables can be increased depending on the number of programs to be distributed. For example, for 2,500 programs, 25 cables would have to be used, in a single trench, with a number of branches for each subscriber to the number of groups of programs in which they are interested. In this case, if the subscribers are interested in all the programs, 25 branches will have to be provided. The cost of the subscription will obviously depend on the number of branches required. It is possible to envisage a substantial reduction in the number of cables and branches by making in advance a preselection at the subscriber end when subscribers would only be interested in one category or one group of programs.

An example of grouping 100 programs by cables: cable No. 1—history; cable No. 2—geography; cable No. 3—natural science; cable No. 4—medicine; cable No. 5—technical; cable No. 6—cookery; cable No. 7 do-it-yourself, cable No. 8—lesson in ....

In addition, with a single cable or a very small number of cables, it would be possible to permit each subscriber to select from a number of programs or groups of programs which is substantially greater than that which is normally provided with the given number of branches. In fact, in accordance with a feature of the invention, it would be sufficient to arrange the converter-seclector so as to enable the subscriber to make a double selection or, if preferred, a preselection followed by a selection. The preselection would bring into line the selected group and the selection would isolate from the group the selected program. This double selection can be made by simple repetition of the means used for single selection, by making a suitable choice of the signals or codes sent to the transmission station by the subscriber via his converter-selector.

Figure 2:
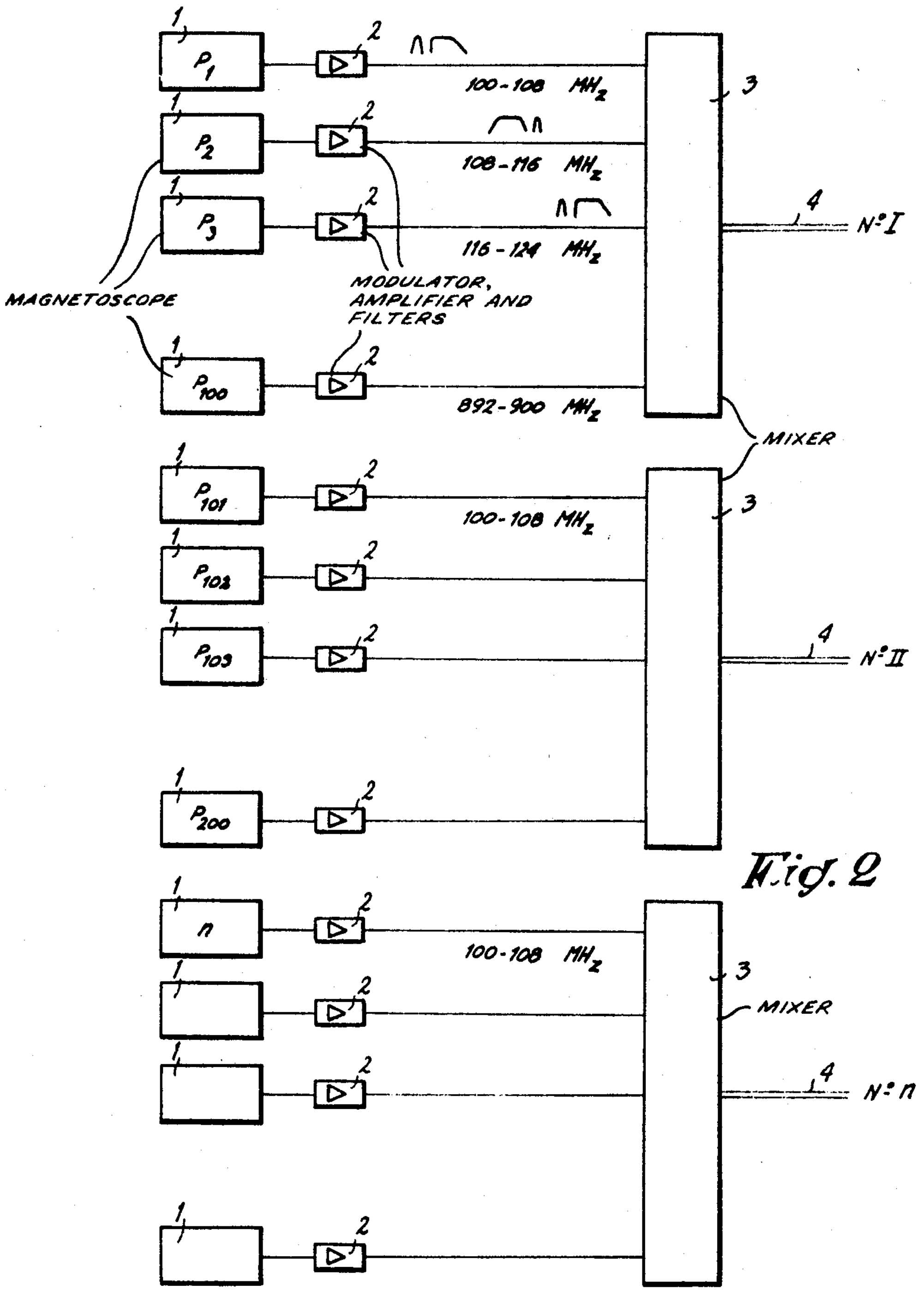
FIG. 2 shows a diagram illustrating the principle of transmitting the programs over a network of cables.
Figure 3:
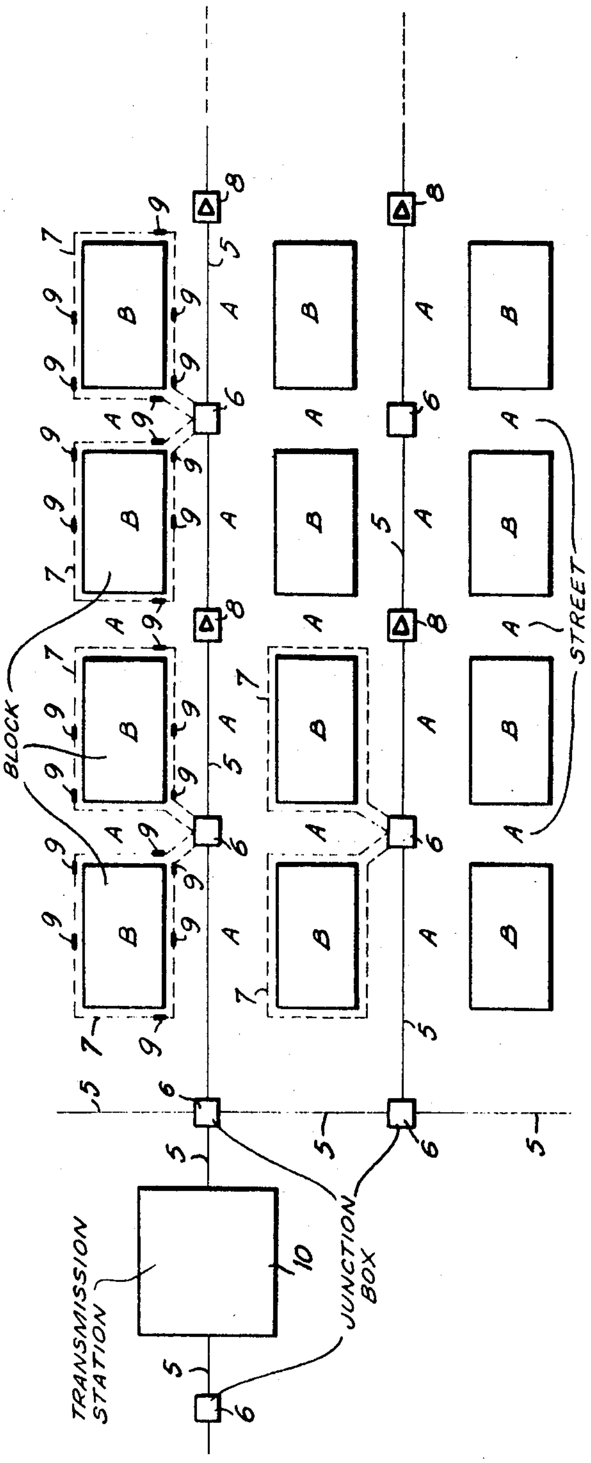
FIG. 3 shows the diagram illustrating the principle of a network for a group made up of blocks of houses.
Figure 4:
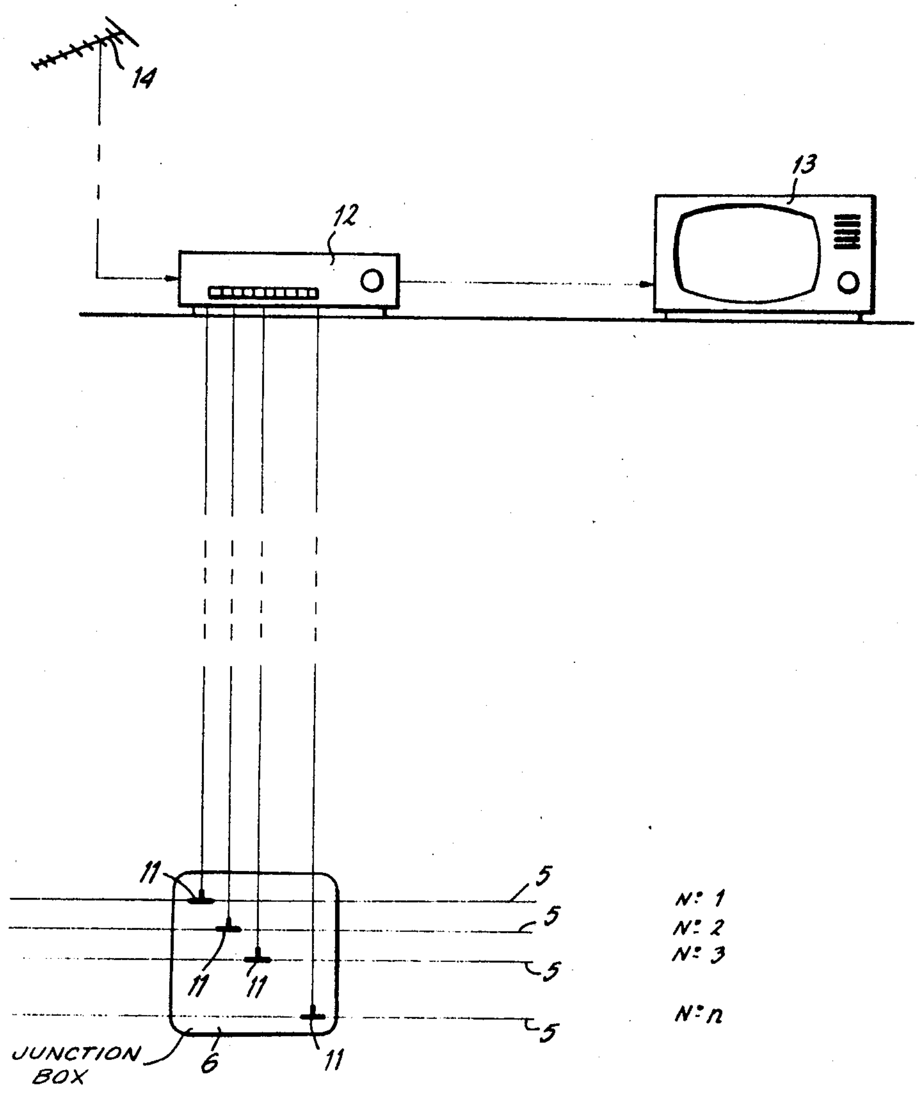
FIG. 4 shows in diagrammatic form the receiver equipment.

In a simple embodiment, FIGS. 2, 3 and 4 illustrate in diagrammatic detail the distribution of programs by coaxial cables with amplifiers, junction boxes and connections. In this embodiment, as illustrated in diagrammatic detail in FIG. 2, for each program $P_1$, $P_2$, $P_3$...; P100, P101, P102...; *n*...; the magnetoscope 1 delivers the program into a modulator-amplifier apparatus 2 with filters, where the transmission is put into the characteristic form of the given channel. The different channels are then introduced into mixing apparatuses 3 to be sent over the corresponding coaxial cable 4 of the network. The same system is repeated for each group of programs, in this case, for each block of 100 supplementary programs.

FIG. 3 shows a diagram illustrating the principle of a network for a group of blocks of houses B separated by traffic thoroughfares A. This problem is interesting, considering that the process and apparatuses according to the invention are advantageously applicable to communities. Here, there is considered a group of 180 habitations per block and a distribution of 100 programs for a single cable. This is only for the facilities of graphic illustration, without any numerical limitation. In this embodiment, the main cable 5 which is generally underground, distributes the signals through the intermediary of junction boxes 6 to the distribution cables 7. These cables may be underground or may have wall fixings.

In order to maintain said signals at a constant level and also to compensate for losses in the cables, amplifiers 8—9 are inserted over the length of the cables of the networks. All these amplifiers will be transistorized and supplied by the coaxial cable itself (12 VDC for example) and the number thereof will mainly depend on their output power.

In the diagram illustrated in FIG. 3, the transmission station is indicated at 10. For reasons of economy, low-power UHF amplifiers will preferably be used, at least for the amplifiers indicated at 9.

FIG. 4 illustrates in diagrammatic form a connecting box for connecting a subscriber to the network. In fact, this Figure illustrates in diagrammatic form an indeterminate number of coaxial cables 5, being the cables No. 1, No. 2, No. 3...*n*. The connections in the box can be made by coaxial connectors 11 or by a system using contact pins or any other known system. The branches are connected to a converter 12 which is itself connected to the commercial television receiver 13 on the one hand and the aerial 14 on the other hand.

As can be seen, there is no great technical difficulty in using the process and apparatuses according to the invention, while the apparatus proper only has to meet the theoretical and practical conditions of conventional audiovisual transmitting and receiving equipment, particularly with regard to the routine care and work for assembling and maintaining the equipment.

In as general a manner as possible, the invention substantially comprises using, in accordance with a preestablished organization, a certain number of program carriers, for example in the form of magnetoscopes, each program tape comprising one or a plurality of tracks for the transmission of code pulses; commercial television receivers; between each of said receivers and said transmission station, a converter-selector device for program tapes such that by means of said converter-selector each subscriber can call on and receive over his commercial television receiver, the selected program, said selected program being automatically returned to the "ready" position after the transmission and said converter-selector being such that it informs the subscriber of the possible occupation of the selected program.

It must also be stated that using the invention has no detrimental affect in any way whatever on the reception, by the users, of ordinary television programs picked up by aerials or any other means.

I claim:

1. A system for automatically and selectively starting from any one of a plurality of substations the emission of any of a plurality of television programs in a transmission station, said system including a cable connection between the transmitting station and the substations, each substation including a television set coupled to said cable connection, means generating selecting signals for said television programs, and means transmitting said selecting signals to said transmitting station, said transmitting means being coupled to said cable connection and being controlled by said generating means, the transmitting station including a plurality of sources of said television programs, each of said sources being a program carrier having at least one control track recorded thereon, said control track controlling said transmitting means to stop the transmission of a program, to return a selected program carrier to its rest position and to send a signal to said substation in case a selected program carrier is not available, means coupled to said cable connection for transmitting the programs of said sources to said substations through said cable connection, means coupled with said cable connection for receiving said selecting signals from said substations and for accordingly controlling corresponding television program sources, transmitting means for the programs of these sources, a transmission channel mixer and a cable-distributing box wherein said transmitting means of said transmitting station are coupled to said cable connection through said transmission channel mixer and said cable distribution box, and wherein said transmitting means of said substation includes a modulator for modulating a carrier wave by said selecting signals, means coupled with said modulator, a free channel selector, and a cable distribution box which is coupled in series with said free channel selector between said cable connection, said television receiver and said modulator.

2. A system in accordance with claim 1, wherein the program carriers consist of magnetic tapes.

3. A system in accordance with claim 1, wherein said program carriers are divided into groups.

4. A system in accordance with claim 3, wherein said television sets are subordinated to one or several of said groups to the exclusion of other group or groups.

5. A system in accordance with claim 4, wherein in case of a plurality of groups said selecting signal generating means are adapted to make a preselection of one group followed by a specific selection of the desired program carrier from the preselected group.

6. A system in accordance with claim 4, wherein in case of a single group said selecting signal generating means are adapted to select a program carrier of said group in one selecting operation.